US007249366B1

(12) United States Patent
Flavin

(10) Patent No.: US 7,249,366 B1
(45) Date of Patent: *Jul. 24, 2007

(54) CONTROL OF A SYSTEM FOR PROCESSING A STREAM OF INFORMATION BASED ON INFORMATION CONTENT

(75) Inventor: Robert Alan Flavin, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,433

(22) Filed: Aug. 5, 1999

Related U.S. Application Data

(62) Division of application No. 09/080,319, filed on May 15, 1998, now Pat. No. 6,005,603.

(51) Int. Cl.
*H04N 7/16* (2006.01)
*H04N 7/10* (2006.01)
*H04N 5/445* (2006.01)

(52) U.S. Cl. ............................ 725/25; 725/28; 725/29; 725/32; 725/46

(58) Field of Classification Search ................. 725/82, 725/110, 138, 139, 144, 148, 151, 12, 14, 725/28, 31, 25, 46
See application file for complete search history.

(56) References Cited

U.S. PATENT DOCUMENTS

| | | | |
|---|---|---|---|
| 4,390,901 A * | 6/1983 | Keiser | 358/147 |
| 4,528,589 A * | 7/1985 | Block et al. | 380/241 |
| 4,605,964 A | 8/1986 | Chard | |
| 4,605,973 A * | 8/1986 | Von Kohorn | 358/335 |
| 4,930,160 A * | 5/1990 | Vogel | 380/23 |
| 5,195,135 A * | 3/1993 | Palmer | 380/20 |
| 5,247,364 A * | 9/1993 | Banker et al. | 348/569 |
| 5,311,423 A * | 5/1994 | Clark | 705/8 |
| 5,382,983 A * | 1/1995 | Kwoh et al. | 348/716 |
| 5,485,219 A * | 1/1996 | Woo | 348/460 |
| 5,559,549 A * | 9/1996 | Hendricks et al. | 348/6 |
| 5,592,551 A * | 1/1997 | Lett et al. | 380/211 |
| 5,600,364 A * | 2/1997 | Hendricks et al. | 348/1 |
| 5,600,573 A * | 2/1997 | Hendricks et al. | 725/109 |
| 5,642,172 A * | 6/1997 | Yoon et al. | 348/603 |
| 5,659,653 A * | 8/1997 | Diehl et al. | 386/46 |

(Continued)

OTHER PUBLICATIONS

Zhang et al. "Automatic Parsing of News Video"—May 1994, pp. 45-54.*

*Primary Examiner*—Scott E. Beliveau
*Assistant Examiner*—Son P. Huynh
(74) *Attorney, Agent, or Firm*—Jesse L. Abzug, Esq.; McGinn IP Law Group, PLLC

(57) ABSTRACT

A segment announcing system is disclosed that contains one or more segment announcement receivers that receive one or more announcements over a network connection and/or other communication connection. The announcements contain content information about the content of broadcast information being broadcast, e.g., to a television. The segment announcement receivers have one or more control outputs to perform a function, typically to control the segment announcement receivers during processing of information called a content stream.

30 Claims, 5 Drawing Sheets

U.S. PATENT DOCUMENTS

| | | | |
|---|---|---|---|
| 5,710,815 A * | 1/1998 | Ming et al. | 380/241 |
| 5,734,853 A * | 3/1998 | Hendricks et al. | 395/352 |
| 5,798,785 A * | 8/1998 | Hendricks et al. | 348/1 |
| 5,818,441 A * | 10/1998 | Throckmorton et al. | 345/328 |
| 5,872,588 A * | 2/1999 | Aras et al. | 348/1 |
| 5,892,536 A * | 4/1999 | Logan et al. | 348/13 |
| 5,917,830 A * | 6/1999 | Chen et al. | 370/487 |
| 5,937,331 A * | 8/1999 | Kalluri et al. | 725/146 |
| 5,990,927 A * | 11/1999 | Hendricks et al. | 725/132 |
| 6,005,562 A * | 12/1999 | Shiga et al. | 345/327 |
| 6,005,603 A * | 12/1999 | Flavin | 348/9 |
| 6,029,045 A * | 2/2000 | Picco et al. | 455/5.1 |
| 6,061,056 A * | 5/2000 | Menard et al. | 345/327 |
| 6,088,455 A * | 7/2000 | Logan et al. | 380/200 |
| 6,108,706 A * | 8/2000 | Birdwell et al. | 709/229 |
| 6,115,057 A * | 9/2000 | Kwoh et al. | 348/5.5 |
| 6,144,401 A * | 11/2000 | Casement et al. | 348/7 |
| 6,216,263 B1* | 4/2001 | Elam | 725/28 |
| 6,263,500 B1* | 7/2001 | Yoshida et al. | 725/25 |
| 6,266,816 B1* | 7/2001 | Watson, Jr. et al. | 725/120 |
| 6,324,694 B1* | 11/2001 | Watts et al. | 725/32 |
| 6,453,473 B1* | 9/2002 | Watson, Jr. | 725/120 |
| 6,539,548 B1* | 3/2003 | Hendricks et al. | 725/109 |
| 6,637,032 B1* | 10/2003 | Feinleib | 725/110 |
| 6,675,384 B1* | 1/2004 | Block et al. | 725/28 |
| 6,697,103 B1* | 2/2004 | Fernandez et al. | 348/143 |

* cited by examiner

| | Announcment Type | Announcment Content (Detail) | Content Stream Id | Announcer Id | Action |
|---|---|---|---|---|---|
| 450 | Start Of Commercial | — | Currently Selected Channel | * (Any) | Sound Off, Picture Off, Pause VCR |
| 451 | End Of Commercial | — | Currently Selected Channel | * (Any) | Sound On, Picture On, Start VCR Recording |
| 452 | Rating | "XXX" | * (Any) | Playboy | Select Channel |
| 453 | Commentary | | | Martha Stewart | Display Text On TV Screen |
| 454 | Content Type | "Weather Report" | WABC Ch. 7 New York City | * (Any) | Select Channel |

Fig. 4

CONTROL OF A SYSTEM FOR PROCESSING A STREAM OF INFORMATION BASED ON INFORMATION CONTENT

The present Application is a Divisional Application of U.S. patent application Ser. No. 09/080,319, filed on May 15, 1998 now U.S. Pat. No. 6,005,603.

FIELD OF THE INVENTION

This invention relates to the control of information processing, e.g. a television. More specifically, the invention relates to control of a television, and/or other related devices, by signals received over one or more connections to communication connection, like a network.

BACKGROUND OF THE INVENTION

Television displays a stream of program segments, sometimes including commercial messages, to users/viewers. This information is received by the television by any number of well known transmission methods including: direct broadcast, cable, fiber optics, etc.

In some of the prior art, some control of the programming is given to the user. For example, there are "pay per view" features in certain cable television networks that provide a particular program to a television viewer only if the viewer agrees to pay for the program, either as a periodic subscription or as a per use payment. Certain subscription services provide specific types of programming (e.g. nature or children's programming) or programming with a limited number or no commercial messages.

In certain information processing systems, e.g., a video recorder, devices can be controlled by characteristics of the signal itself. For example, a dark screen occurring in a television program being recorded indicates that a commercial is about to begin (end) and that the record speed of the video recorder should be slowed down (sped up).

However, in much of the prior art, there is a limited amount of automatic control that the user has over his television based on the content of the information being received by the television. Therefore, there is a need for an improved way to control the content outputted by a television (either to the television monitor and/or to an attached processing device like a video recorder) in standard television programming that is based on the content of the information that is being received by/sent to the television.

SUMMARY OF THE INVENTION

An object of this invention is to provide a system and method for generating an output function based on the content of a stream of information.

An object of this invention is an improved system and method for controlling the information that is outputted from a television.

An object of this invention is a system and method that uses content of information to select specific information to be outputted from a television.

An object of this invention is a system and method that uses content of information to prevent specific information (e.g. commercials) from being outputted from a television.

In a first aspect of the present invention, a segment announcing system is disclosed that contains one or more segment announcement receivers that receive one or more announcements over a network connection and/or other communication connection. The announcements contain descriptions about the content of broadcast information (content stream), e.g., being broadcast to a television. The segment announcement receivers have one or more control outputs to perform one or more functions. For example, one of the control outputs can be connected to one or more televisions and/or one or more television processing devices (like a video recorder). The type of control used depends on the description of the content stream being broadcast/received and, in a preferred embodiment, preferences of the user.

The announcements have one or more headers that have content descriptions, e.g., one or more categories of content describing a segment of broadcast information (content stream). Descriptions of the segment/content stream, e.g., the start and/or end time (and/or duration) of the segment, is also included in the network message. In one preferred embodiment, certain types of categories of content, e.g. commercials, produce certain types of control functions, e.g. sound muting or video recorder pause. In other preferred embodiments, after one or more of these content categories is matched to a filter record in the segment announcement receiver, an appropriate control output associated with the respective content category is activated and the television (segment announcement receiver) is controlled the selected way, e.g. during the processing of the information (content stream).

In one preferred embodiment a service is provided by a server on the network, called a segment announcer. The server has a process that composes the network messages and transmits them to all or to selected (e.g. those paying for the service) segment announcement receivers connected on the network.

BRIEF DESCRIPTION OF THE DRAWINGS

FIG. 4 is a block diagram of an example filter record in a preferred embodiment of the segment announcement receiver.

DETAILED DESCRIPTION OF THE PREFERRED EMBODIMENTS OF THE INVENTION

Figure 1:
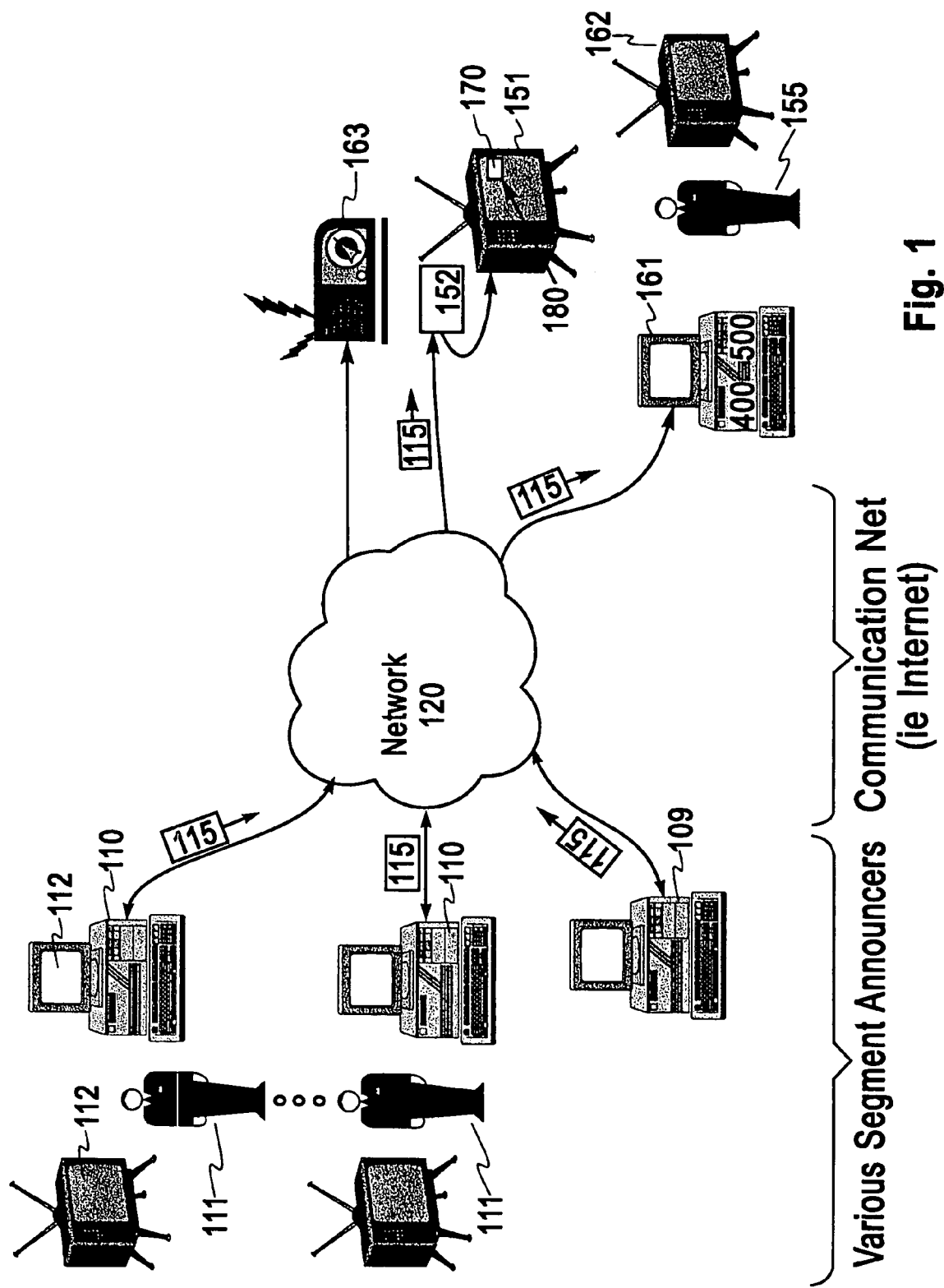
FIG. 1 is a block diagram of the segment announcer system showing one or more segment announcers, a communication connection, and one or more connected segment announcement receivers, e.g. a video recorder or a television.

FIG. 1 is a block diagram of the segment announcer system 100 showing one or more segment announcers 110, a communication connection 120, and one or more connected segment announcement receivers, e.g. a video recorder or a television.

The segment announcer 110 is a computer workstation, e.g. an IBM laptop personal computer, that is typically used by a person 111 or group of people 111 to enter descriptive information about the content of one or more content streams 112 they 111 are perceiving. The content streams 112 can include any type of information as follows: a television program, a radio program, a corporate information session, a commercial, a live sporting event, etc.

For example, the person 111 can represent a special interest group that is viewing the content of a television program being broadcast in real time or alternatively to be broadcast using tape at a later time. This person would provide descriptive information, like a rating, based on his organization's viewpoint. For instance, an animal rights group 111 would input descriptive information about the treatment of certain animals on a nature television program to be aired later in the day.

In an alternative example, the person 111 could be a spectator at a live sporting event that has interest in a specific player's performance. When that player does something noteworthy, descriptive information (250 below) about the event is inputted.

In another example, a group of people 111 will monitor a television (radio) program and indicate when a commercial begins or ends. If one of the people 111 is inattentive, one of the others 111 will input the description 250 instead.

In another preferred embodiment, the segment announcer 109 is a central data bank of descriptive information 250 about the content of various content streams 112 currently being transmitted and/or to be transmitted in the future. These descriptions can be submitted in real time (e.g., as describe about) over communication connections 120 like the Internet and/or can be provided from various interest groups as stored data files. For example, the owner of the segment announcer 110 would buy comments, rating, etc. from various movie critics and provide them to the segment announcement receivers as they view them movie. Certain religious or political groups 111 might also provide descriptions (comments, ratings, etc.) About the information as well. Payments could be made for the descriptions 250, either by the owner of the segment announcer or by the groups 111 seeking to have their descriptions 250 transmitted to the segment announcement receivers. The users 155 of the segment announcement receivers might also pay for the transmission of these descriptions 250.

Other examples of descriptions 250 include: a rating, a category, a comment, a content description, a segment type, a program part, a program source, a review, a statistic, and a character name.

The descriptions 250 of the content are transmitted by announcement 115 over the communication link 120 to the segment announcement receivers 150. The announcement 115 is further described in FIG. 3.

This content information is transmitted to one or more segment announcement receivers 150 over one or more well known transmission modes/connections 120. While FIG. 1 shows the mode as a network 120, other transmissions modes like multicast packets over the Internet, radio broadcast, cable networks, Digital Video Broadcast data stream (DVB), vertical blanking interval (for analog television), satellite, and telephone, are envisioned without loss of generality.

The segment announcement receivers receive the announcements 115. The segment announcement receivers are any single processing device that processes the signal being transmitted over the communication connection 120. In one preferred embodiment, the communication connection is a television broadcast (e.g., off air or cable) and the segment announcement receiver is a television and/or video recorder. Other examples of a segment announcement receiver include: a radio 163, a deferred use device (like a tape delay (not shown) or video recorder (not shown)), a closed circuit television 162, and a computer 161. These devices have known communication interfaces 152 appropriate for the communication mode 120. For example, the interface 152 for the Internet might be a modem or network interface card and the interface 152 for a radio would be a tuner/demodulator circuit.

The announcements 115 are processed by the segment announcement receivers to cause a function 170 to occur. Typically, the function 170 is performed by a particular known control device 180 and the function controls some aspect of the segment announcement receiver. For example, if the descriptive information indicates that the content stream is a commercial, a function 170 would be performed to adjust the sound control (stop record) 180 of the television (video recorder) to mute (stop) 170 at the beginning of the commercial and to restore the sound (resume recording) 170 at the end of the commercial. Other examples of functions 170 using known controls 180 are: a message display, a mute, a stop record, a play, a start record, a screen blanking, and an alarm.

In some preferred embodiments, the segment announcement receivers 150 have data structures 400 and processes 500 that are used to automatically control the function of the segment announcement receivers based on the one or more of the content descriptions of one or more of the content streams. See the description below.

Figure 2:
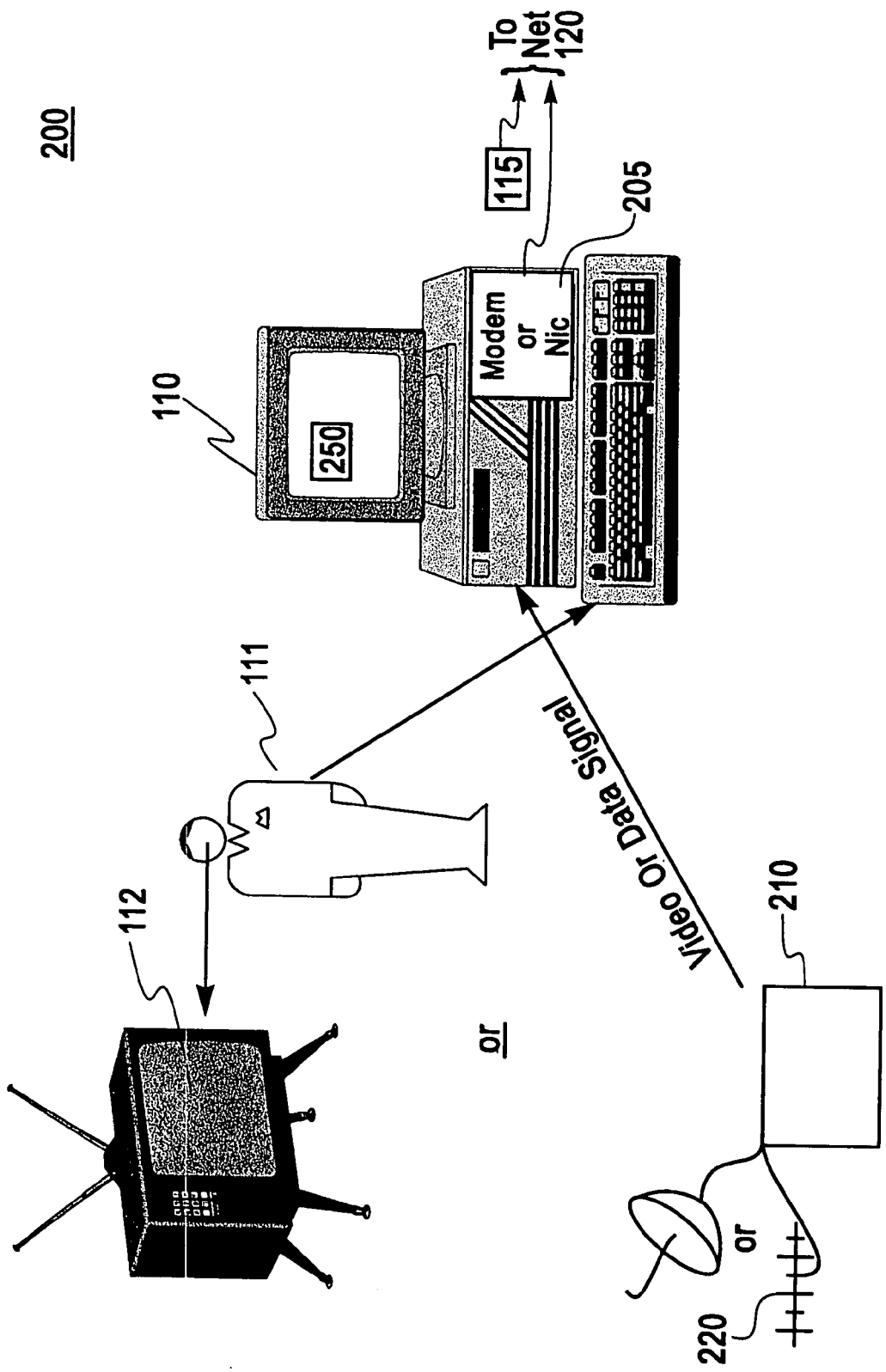
FIG. 2 is a block diagram showing alternative preferred embodiments of the segment announcer.

FIG. 2 is a block diagram showing alternative preferred embodiments of the segment announcer 110. Features in common with those in FIG. 1 have the same designation numbers and description as above. The segment announcers 110 has a communication connector 205 appropriate to the communication connection 120 used. For example, if the communication connection 120 is the Internet, the communication connector 205 is a modem and/or a network interface card. If the communication connection 120 is a radio or television over land broadcast signal, the communication connector 205 is a well known transmitter.

As stated before, the person/group 111 perceives (views, listens to) the content stream 112 and enters descriptive information 250 into the segment announcer 110.

In an alternative embodiment, the descriptions 250 are entered automatically. For example, the descriptions 250 about the various content streams 112 can be sent by a communications link 220, e.g. the Internet and/or a satellite connection that is fed as a data signal to the segment announcer. In some cases these descriptions 250 are already associated with the content streams, e.g., "Nielson ratings" and programming descriptions from various (television) program subscription services. Other devices can be used to automatically provide descriptions 250 about the content stream 112, e.g., an image brightness detection device, for detecting brightness changes at commercial boundaries, and/or other video image process devices that queries images by image content (see QBIC, an IBM video processor).

The system can be based on a combination of human monitors or electronic means of determining when program segments start and end. More than one monitor (human or electronic) may be used for each program, the inputs from the monitors can be weighted in various means based on the reliability of the monitors (i.e., if there are three monitors of one program and two of them say the program has resumed, the system could 'vote' that the program has resumed. It could discount input from monitors 111 who prove to be unreliable or slow.) Servers 110 can listen to input from several monitors 111 and produce a more homogenized (perhaps more reliable) source of announcements 115.

In one embodiment, a service provided by the segment announcer 109 can naturally be combined with a TV schedule application, to allow applications to 'record the Simpsons when it comes on' 170, eliminating commercials 170 that come on before, during and after the broadcast. In this embodiment, more than one announcement 115 might be used, i.e., turn on the recorder 160 when the show comes on, stop recording (170, 180) the commercials, and start recording (170, 180) when the show comes back on.

The service can also allow content within a single program to be identified, such as 'turn it on when the weather forecast is on the local news', or 'record Andy Rooney's segment of 60 Minutes'.

In one preferred embodiment, the segment announcer 110 (perhaps using HTTP) associates a Content Stream ID (322 below) with a specific broadcast (i.e. 'Star Trek on channel 11 from New York City' as opposed to a possibly different 'StarTrek' from New Haven, Conn., or 'ABC News on the East Coast feed' as opposed to the West Coast feed.)

Each announcement 115 is contained in a separate multicast UDP packet. Each packet contains the id of the program, the id of the monitor sending the report, the time of the event, and the type of event. This allows other information (such as commentary, copyright information, lyrics, captions and/or cue points to the included. Absolute time stamps are used (rather than the 'delta time' used in MIDI) because messages may be missed and because messages may be delayed.

Because absolute time stamps can be used as part of the description 250, the announcements (event messages) 115 for a program may be recorded for later use. If a program is recorded in its entirety the record of the events can be used in later viewing to fast forward, or used for ending purposes.

Figure 3:
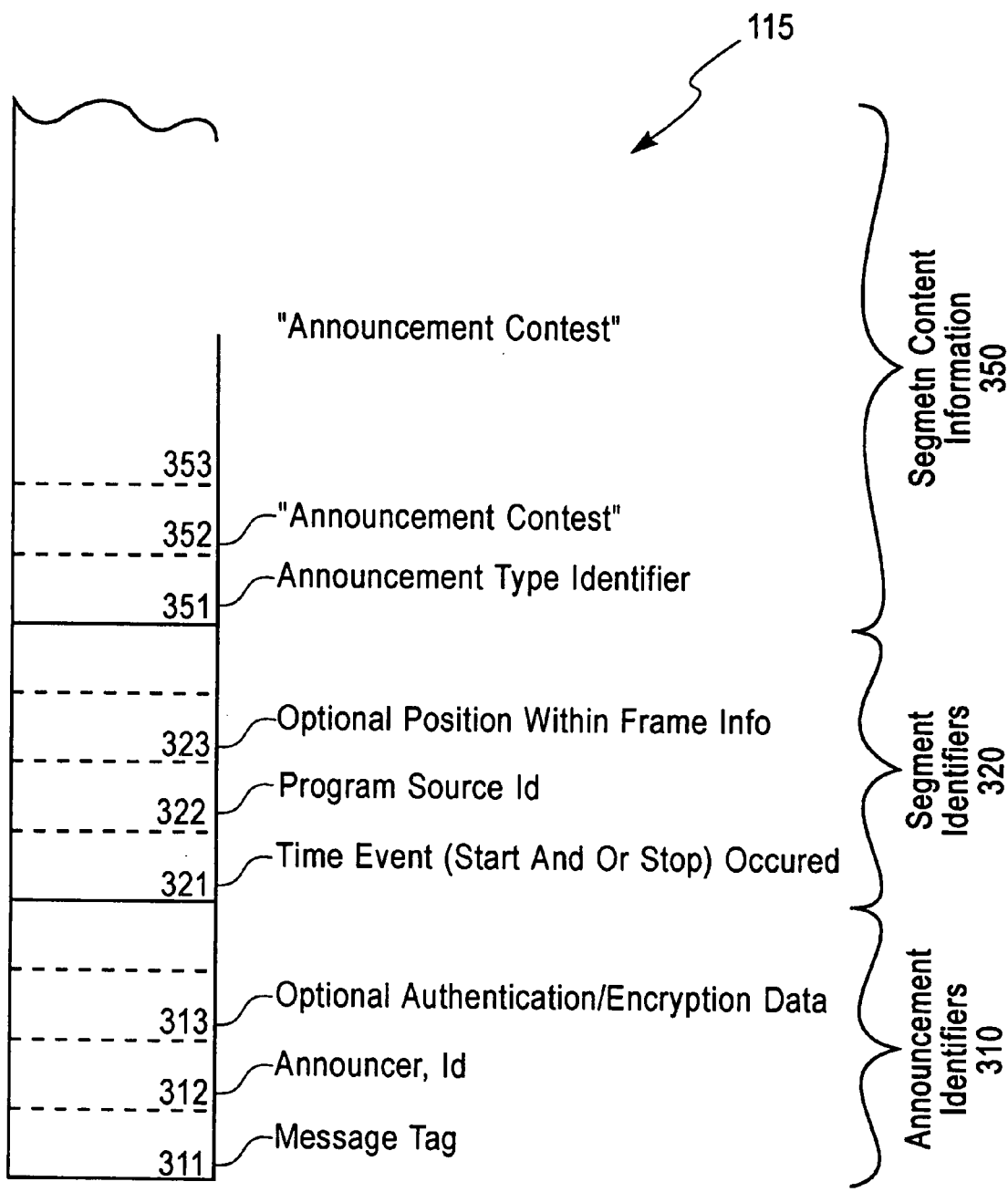
FIG. 3 is a block diagram of an example announcement.

FIG. 3, Segment Announcement Message, or announcement, 115

A segment announcement message 115 is used to communicate one or more pieces of information about what is going on in a segment (instant or interval) of the content stream 112. This message typically comprises three parts: 1) Announcement Identifiers 310, 2) Segment Identifiers 320 and Segment Content Information 350.

In a preferred embodiment, the Announcement Identifier comprises the following fields: 1) the Message Tag 311, which identifies this message as a Segment Announcement Message; the Announcer Id 312 which indicates who is issuing the announcement (the origin and/or source of the announcement, e.g. "Greenpeace"); and optional Authentication and or Encryption Data 313, which can be used to verify that the message came from the specified source and can prevent unauthorized use of the information.

The Segment Identifier section 320 has information identifying specific content in a segment or portion of the content stream 112 among all the hours of television being broadcast, and comprises: the Time 321, the time of day at which the event described in this announcement 115 was transmitted in the content stream 112; the Program Source Id 322, which indicates which broadcast or transmission this refers to (i.e., WCBS, Channel 2 in New York City, or CNN Airport Channel, East Coast Feed), and optionally Position Within Frame Info 323, which indicates what point or area within a video frame to which the announcement 115 applies. Together the time 321 and Content Stream ID 322, and position (e.g. within frame) 323 identify what segment or portion of the content stream to which the announcement 115 is message applies.

The Segment Content Information 350 describes the event in the segment (content stream 112) and comprises: the Announcement Type Identifier 351 which indicates what sort of information this event describes. The Fixed Length Announcement Content 352 and the Variable Length Announcement Content 353 fields are optional and contain the additional description. For example, an Announcement Type of 'Start of Commercial' or 'End of Commercial' would require no Announcement Content fields. A 'Rating' type message could contain an Announcement Content of 'G', 'PG', 'R', 'X' or 'XXX'. A 'Comment' type message could contain a long text message or digital audio data.

FIG. 4 is a block diagram of an example a filter record 400 in a preferred embodiment of the segment announcement receiver.

A preferred embodiment uses a table 400 as the basis of the Announcement Receiver's process for handling messages. The table contains rows (as an example, typically 450–454), which constitute the user's wishes for how Announcement Messages 115 should be processed. If a row is considered to 'match' the Announcement Message 115, an 'action' 425 specified in the record is carried out.

Each row typically contains 5 fields: 1) the Announcement Type Field 405, 2) the Announcement Content Field 410, 3) the Content Stream Id Field 415, 4) the Announcer Id Field 420 and 5) the Action Field 425. Each of the first four fields can contain either a value that matches the corresponding field in an Announcement Message 115, or an 'Any' indication. The Content Stream Id Field 415 may also contain a 'Currently Selected Channel' value that is considered to be a match if the message's Content Stream Id matches the channel that the user (of the VCR) is currently watching. An 'Any' value is always considered a match.

The Action Field 425 contains a list of functions 170 for the receiver to perform in case of a match. These functions 170 are performed by the known control devices 180 and could include: turning the sound on or off, turning the picture on or off, changing the selected TV channel, displaying text on a TV or computer screen, sounding an alarm, starting or stopping recording on a VCR.

Figure 5:
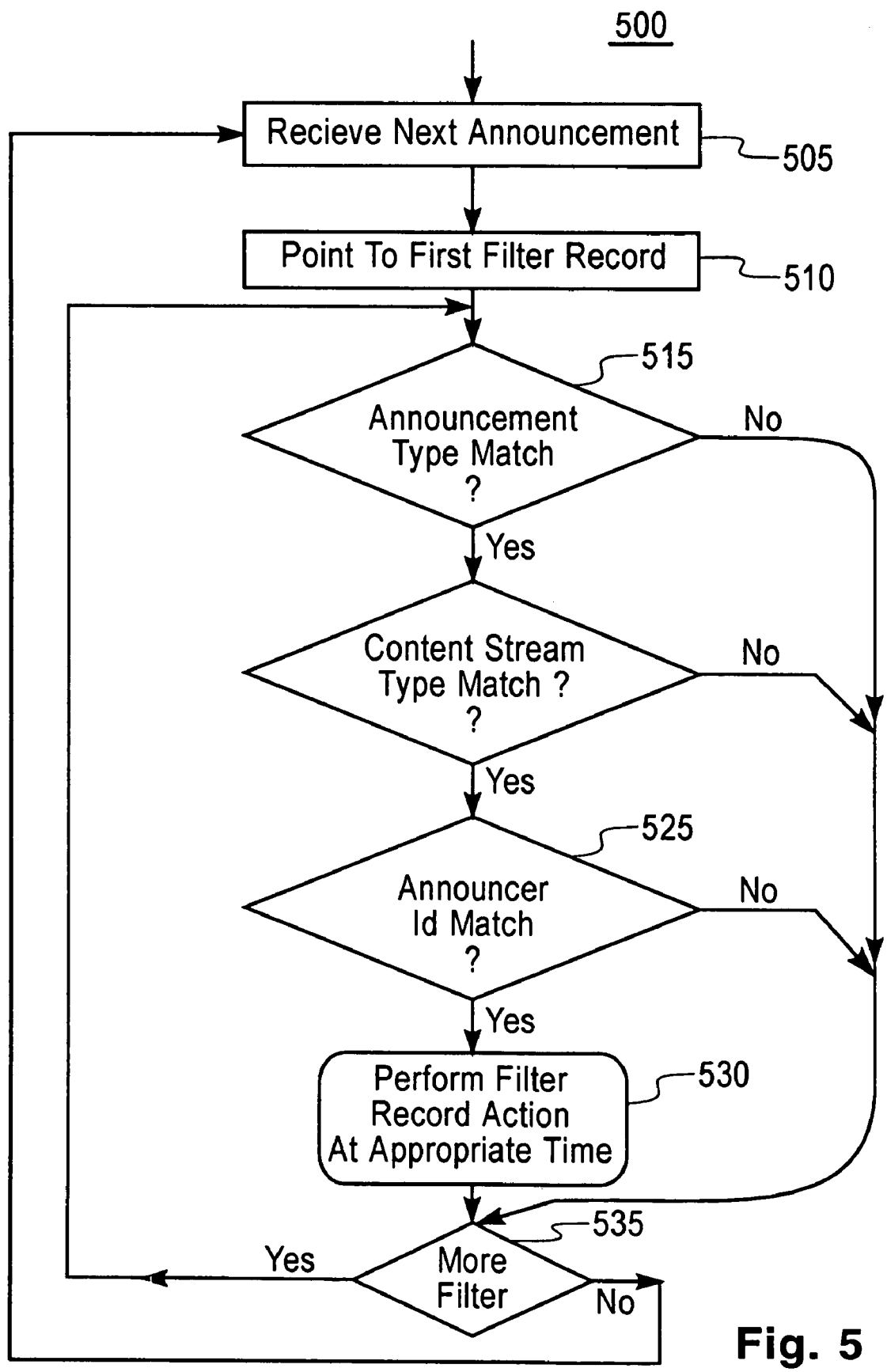
FIG. 5 is a flow chart of a process operating within the segment announcement receiver that activates/deactivates the control output(s) when certain packet information in the network message is received.

FIG. 5 is a flow chart of a process 500 operating within the segment announcement receiver that activates/deactivates the control output(s) 180 when certain packet information in the network message (announcement 115) is received.

The process that is the heart of the Announcement Receiver is a loop that: 1) waits for the next announcement 115 to arrive 505, 2) finds any rows of the Filter Table 400 that match the announcement 510–525 and 3) perform the actions associated with each matching record 530.

After receiving the announcement 505 (perhaps with a Socket recv( ) function), the programs sets a pointer to the first row in the Filter Table 400 and checks to see of the first four fields in the table 405–420 match the corresponding fields in the announcement 115. If they match, the Action Field 425 is examined and each of the actions is performed 530. Whether the first record matches or not, if there are more records to test the pointer is incremented to point to the next record and the next record is checked for a match, and so on.

The matching process 515–525 consists of the relevant fields in the message's Announcement Identifiers 310, Segment Identifiers 320 and Segment Content Information 350 matches the corresponding fields in the Filter Table Record 450–454. If the corresponding fields do not actually match, but the filter record contains an 'Any' indication, then the program proceeds as if the fields actually matched. In the case of the Content Stream Id Field 415 and 322, if the filter record field is 'Currently Selected Channel' then the fields are considered a match if the announcement's field matches the channel that the TV or VCR is currently tuned to.

The announcement message 115 has an event time 321 associated with it. For most real time applications, the announcement will be received shortly after the event in the content stream has occurred. (i.e., the announcement of the beginning of the commercial won't get to you until slightly after the commercial is showing on your TV. This is because of the time it takes to detect the commercial and the delay in transmission of the announcement.) In this case the actions 425 are executed as soon as the announcement has been matched 515–525, which is usually good enough. In some situations, announcements 115 can be sent before the time of the event in the content stream 112, in which case the execution of the action 425 is delayed.

In some situations the display of the content stream can be delayed, by later video tape replay, or by short term electronic delay in the TV. This allows the system to correct the delay in detecting and transmitting announcements by performing the action 425 at the correct time relative to the display of the content stream 112.

The invention claimed is:

1. A segment announcement receiver comprising:
   a receiver section that receives a plurality of announcements, wherein each of said plurality of announcements corresponds to a content being provided on one or more content streams, and said plurality of announcements are created by a plurality of announcers which are other than a broadcaster of said one or more content streams and include:
      a description about said corresponding content in said one or more of the content streams;
      a time at which said corresponding content is transmitted on said signal, and
      a content identifier;
   a filter record including a plurality of actions corresponding to an announcement type, content stream type, and announcer identification, said plurality of actions including at least one user preference for altering a presentation of said one or more content streams; and
   a controller that:
      compares an announcement type for an announcement in said plurality of announcements with said announcement type in said filter record, compares an announcer identification for said announcement with said announcer identification in said filter record, and compares a content stream type for said one or more content streams with said content stream type in said filter record; and
      if said announcement type for said announcement matches said announcement type in said filter record, said announcer identification for said announcement matches said announcer identification in said filter record, and said content stream type for said one or more content streams matches said content stream type in said filter record, selects a corresponding action from said plurality of actions to alter said presentation in accordance with said at least one user preference,
   wherein said plurality of announcements are not received via said broadcaster
   wherein said plurality of actions comprises at least one of switching a sound device of a presentation device to an ON state, switching the sound device of said presentation device to an OFF state, switching a display apparatus of said presentation device to an ON state, switching a display apparatus of said presentation device to an OFF state, changing the channel on said presentation device, starting a recording operation, and stopping a recording operation.

2. A segment announcement receiver, as in claim 1, where the description includes any one or more of the following: a rating, a category, a comment, a content description, a segment type, a program part, a program source, a review, a statistic, and a character name.

3. A segment announcement receiver, as in claim 1, wherein the segment announcement receiver further comprises any one or more of the following: a television, a radio, a closed circuit television, a video recorder, and a computer.

4. A segment announcement receiver as in claim 1, wherein said presentation is by any one or more of the following: a television, a radio, a closed circuit television, a video recorder, and a computer.

5. The receiver of claim 1, further comprising a presenting section for presenting said content stream, wherein said controller controls said presenting section to alter said presentation.

6. The receiver of claim 1, wherein said receiver section receives said plurality of announcements via a first communication connection and wherein said one or more content streams are provided on a second communication connection that is separate from said first communication connection.

7. The receiver of claim 1, wherein said receiver section receives said plurality of announcements via the Internet and wherein said one or more content streams are provided on a communication connection that is separate from said Internet.

8. The receiver of claim 1, wherein said receiver section receives said plurality of announcements via a telephone network and wherein said one or more content streams are provided on a communication connection that is separate from said telephone network.

9. The receiver of claim 1, wherein said one or more content streams are provided on one of a cable television network, a television airwave broadcast and a satellite network and wherein said receiver section receives said plurality of announcements via a connection that is completely independent of said one of a cable television network, a television airwave broadcast and a satellite network.

10. The receiver of claim 1, wherein said receiver section receives said plurality of announcements via a radio broadcast and wherein said one or more content streams are provided on a communication connection that is separate from said radio broadcast.

11. The receiver of claim 1, wherein said receiver section receives said plurality of announcements via a satellite broadcast and wherein said one or more content streams are provided on a communication connection that is separate from said satellite broadcast.

12. The receiver of claim 1, wherein said receiver section receives said plurality of announcements via a data network and wherein said one or more content streams are provided on a communication connection that is separate from said data network.

13. The receiver of claim 1, wherein said receiver section receives said plurality of announcements via physical transport of a storage media and wherein said one or more content streams are provided on a communication connection that is separate from said physical transport of said storage media.

14. A segment announcement receiver comprising:
   a first receiver section that receives one or more content streams on a content carrier signal;

a second receiver section that receives a plurality of announcements which are created by a plurality of announcers which are other than a broadcast of said one or more content streams, said plurality of announcements including:
  a description about a corresponding content within said one or more content streams,
  a time at which the corresponding content is transmitted by the first receiver section, and
  a content identifier;
a filter record including a plurality of actions corresponding to an announcement type, content stream type, and announcer identification, said plurality of actions including at least one user preference for altering a presentation of said one or more content streams; and
a controller that:
  compares an announcement type for an announcement in said plurality of announcements with said announcement type in said filter record, compares an announcer identification for said announcement with said announcer identification in said filter record, and compares a content stream type for said one or more content streams with said content stream type in said filter record; and
  if said announcement type for said announcement matches said announcement type in said filter record, said announcer identification for said announcement matches said announcer identification in said filter record, and said content stream type for said one or more content streams matches said content stream type in said filter record, selects a corresponding action from said plurality of actions to alter said presentation in accordance with said at least one user preference,
wherein said plurality of actions comprises at least one of switching a sound device of a presentation device to an ON state, switching the sound device of said presentation device to an OFF state, switching a display apparatus of said presentation device to an ON state, switching a display apparatus of said presentation device to an OFF state, changing the channel on said presentation device, starting a recording operation, and stopping a recording operation.

15. The receiver of claim 14, further comprising a presenting section for presenting said content stream, wherein said controller controls said presenting section to alter said presentation.

16. The receiver of claim 14, wherein said first receiver section receives said one or more content streams via a first communication connection and wherein said second receiver section receives said plurality of announcements on a second communication connection that is separate from said first communication connection.

17. A segment announcement system comprising:
an analyzer that analyses a content of one or more content streams;
an announcement generator that creates a plurality of announcements containing a description about said content of one or more of the content streams;
a transmitter section that sends said plurality of announcement to one or more receivers, said plurality of announcements being provided by a plurality of announcers which are other than a broadcaster of said one or more content streams,
wherein each of said receivers comprises:
  a filter record including a plurality of actions corresponding to an announcement type, content stream type, and announcer identification, said plurality of actions including at least one user preference for altering a presentation of said one or more content streams; and
  a controller that:
    compares an announcement type for an announcement in said plurality of announcements with said announcement type in said filter record, compares an announcer identification for said announcement with said announcer identification in said filter record, and compares a content stream type for said one or more content streams with said content stream type in said filter record; and
    if said announcement type for said announcement matches said announcement type in said filter record, said announcer identification for said announcement matches said announcer identification in said filter record, and said content stream type for said one or more content streams matches said content stream type in said filter record, selects a corresponding action from said plurality of actions to alter said presentation in accordance with said at least one user preference,
  wherein said plurality of actions comprises at least one of switching a sound device of a presentation device to an ON state, switching the sound device of said presentation device to an OFF state, switching a display apparatus of said presentation device to an ON state, switching a display apparatus of said presentation device to an OFF state, changing the channel on said presentation device, starting a recording operation, and stopping a recording operation.

18. A segment announcement system, as in claim 17, wherein the analyzer comprises any one or more of the following: a person, a group of people, and an electronic signal processor.

19. A segment announcement system, as in claim 18, wherein the electronic signal processor includes any or more of the following: a brightness detection device, and video image process that queries by image content.

20. A segment announcement system, as in claim 17, wherein the announcement further comprises a time associated with the content.

21. A segment announcement system, as in claim 20, wherein the announcement further comprises a content identifier.

22. The receiver of claim 17, further comprising a presenting section for presenting said content stream, wherein said controller controls said presenting section to alter said presentation.

23. The system of claim 17, wherein said analyzer analyzes said content on said one or more content streams on a first communication connection and wherein said transmitter section sends said announcement to said one or more receivers using a second communication connection that is separate from said first communication connection.

24. A closed circuit transmission system comprising:
a segment announcer comprising:
  an analyzer that analyses a content of one or more content streams, wherein said analyzer comprises a party other than a broadcaster of said content;
  an announcement generator that creates a plurality of announcements containing a description about said content and a time associated with said content; and
  a transmitter section that sends the plurality of announcements; and a segment announcement receiver comprising:
- a receiver section for receiving said plurality of announcements and said one or more content streams;
- a filter record including a plurality of actions corresponding to an announcement type, content stream type, and announcer identification, said plurality of actions including at least one user preference for altering a presentation of said one or more content streams; and
- a controller that:
  - compares an announcement type for an announcement in said plurality of announcements with said announcement type in said filter record, compares an announcer identification for said announcement with said announcer identification in said filter record, and compares a content stream type for said one or more content streams with said content stream type in said filter record; and
  - if said announcement type for said announcement matches said announcement type in said filter record, said announcer identification for said announcement matches said announcer identification in said filter record, and said content stream type for said one or more content streams matches said content stream type in said filter record, selects a corresponding action from said plurality of actions to alter said presentation in accordance with said at least one user preference, wherein said announcement is not sent to said receiver via said broadcaster, and wherein said plurality of actions comprises at least one of switching a sound device of a presentation device to an ON state, switching the sound device of said presentation device to an OFF state, switching a display apparatus of said presentation device to an ON state, switching a display apparatus of said presentation device to an OFF state, changing the channel on said presentation device, starting a recording operation, and stopping a recording operation.

25. The receiver of claim 24, further comprising a presenting section for presenting said content stream, wherein said controller controls said presenting section to alter said presentation.

26. The system of claim 24, wherein said analyzer analyzes said content on said one or more content streams on a first communication connection and wherein said transmitter section sends said announcement to said one or more receivers using a second communication connection that is separate from said first communication connection.

27. A process comprising:
- providing a plurality of announcements by a plurality of announcers which are other than a broadcaster of a content stream;
- receiving said content stream, said plurality of announcements having a description about a content of said content stream;
- referring to a filter record including a plurality of actions corresponding to an announcement type, content stream type, and announcer identification, said plurality of actions including at least one user preference for altering a presentation of said one or more content streams;
- comparing an announcement type for an announcement in said plurality of announcements with said announcement type in said filter record, comparing an announcer identification for said announcement with said announcer identification in said filter record, and comparing a content stream type for said one or more content streams with said content stream type in said filter record; and
- if said announcement type for said announcement matches said announcement type in said filter record, said announcer identification for said announcement matches said announcer identification in said filter record, and said content stream type for said one or more content streams matches said content stream type in said filter record, selects a corresponding action from said plurality of actions to alter said presentation in accordance with said at least one user preference, wherein said announcement is not provided via said broadcaster, wherein said plurality of actions comprises at least one of switching a sound device of a presentation device to an ON state, switching the sound device of the presentation device to an OFF state, turning a display apparatus of the presentation device to an ON state, turning the display apparatus of the presentation device to an ON state, changing the channel on the presentation device, starting a recording operation, and stopping a recording operation.

28. The process of claim 27, wherein said providing comprises providing said announcement to a first communication connection and wherein said content stream is provided on a second communication connection that is separate from the first communication connection.

29. A segment announcement receiver comprising:
- means for providing a plurality of announcements from a plurality of announcers which are other than a broadcaster of a content stream;
- means for receiving said content stream, said plurality of announcements having a description about a content of said content stream;
- means for referring to a filter record including a plurality of actions corresponding to an announcement type, content stream type, and announcer identification, said plurality of actions including at least one user preference for altering a presentation of said one or more content streams;
- means for comparing an announcement type for an announcement in said plurality of announcements with said announcement type in said filter record, comparing an announcer identification for said announcement with said announcer identification in said filter record, and comparing a content stream type for said one or more content streams with said content stream type in said filter record; and
- means for selecting a corresponding action from said plurality of actions to alter said presentation in accordance with said at least one user preference, if said announcement type for said announcement matches said announcement type in said filter record, said announcer identification for said announcement matches said announcer identification in said filter record, and said content stream type of said one or more content streams matches said content stream type in said filter record, wherein said announcement is not provided via said broadcaster, and wherein said plurality of actions comprises at least one of switching a sound device of a presentation device to an ON state, switching the sound device of the presentation device to an OFF state, switching a display device of the presentation device to an ON state, switching the display device of the presentation device to an ON state, changing the channel on a presentation device, starting a recording operation, and stopping a recording operation.

30. The process of claim 29, wherein said means for providing comprises means for providing said announcement to a first communication connection and wherein said content stream is provided on a second communication connection that is separate from the first communication connection.

* * * * *